US008310495B2

(12) United States Patent
Bae et al.

(10) Patent No.: US 8,310,495 B2
(45) Date of Patent: Nov. 13, 2012

(54) METHOD AND APPARATUS FOR DRIVING DISPLAY DATA

(75) Inventors: Jong-kon Bae, Seoul (KR); Kyu-young Chung, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1069 days.

(21) Appl. No.: 11/857,500

(22) Filed: Sep. 19, 2007

(65) Prior Publication Data

US 2008/0109631 A1 May 8, 2008

(30) Foreign Application Priority Data

Sep. 19, 2006 (KR) ........................ 10-2006-0090704
Aug. 7, 2007 (KR) ........................ 10-2007-0079186

(51) Int. Cl.
*G06F 12/00* (2006.01)

(52) U.S. Cl. ........................................................ 345/568

(58) Field of Classification Search .................. 345/659, 345/568
See application file for complete search history.

(56) References Cited

U.S. PATENT DOCUMENTS 3,995,253 A * 11/1976 Morrin et al. ................. 382/305
4,882,683 A * 11/1989 Rupp et al. .................... 345/568
6,819,334 B1 * 11/2004 Owada et al. ................. 345/659
2003/0067434 A1 * 4/2003 Haga et al. ....................... 345/98
2007/0002060 A1 * 1/2007 King ............................ 345/519

FOREIGN PATENT DOCUMENTS

| | | |
|---|---|---|
| JP | 06-324644 | 11/1994 |
| JP | 2003-295831 | 10/2003 |
| JP | 2005-274760 | 10/2005 |
| KR | 2005-274758 | 10/2005 |
| KR | 1020070003643 | 1/2007 |

* cited by examiner

*Primary Examiner* — Edward Martello
(74) *Attorney, Agent, or Firm* — Volentine & Whitt, PLLC

(57) ABSTRACT

In one aspect, an apparatus for driving display data includes an address mapping unit which generates second address units by dividing gradation data displayed on a plurality of pixels in a display panel into a plurality of first address units that are in the form of an a×b matrix, and mapping addresses of the gradation data in each of the first address units into the form of a b×a matrix, wherein the plurality of the first and second address units are arranged in the form of an M×N matrix, wherein a, b, M and N are natural numbers, and a is greater than b. The apparatus further includes a memory unit which stores the second address units having the mapped addresses in the form of a b×a matrix as units in the form of an M×N matrix, a data output unit which receives the data in a×N columns output from the memory unit and outputs the data as data in b×N columns, and a source driver block which receives the data in the b×N columns and transmitting the data to the display panel.

8 Claims, 14 Drawing Sheets

METHOD AND APPARATUS FOR DRIVING DISPLAY DATA

CROSS-REFERENCE TO RELATED PATENT APPLICATION

A claim of priority is made to Korean Patent Application Nos. 10-2006-0090704 and 10-2007-79186, respectively filed Sep. 19, 2006 and Aug. 7, 2007, in the Korean Intellectual Property Office, the disclosures of which are incorporated herein in their entirety by reference.

BACKGROUND OF THE INVENTION

1. Field of the Invention

The present invention relates to a method of mapping addresses, and a method and apparatus for driving display data, and more particularly, to a method of mapping addresses by dividing addresses into a plurality of address units and mapping the addresses in each address unit.

2. Description of the Related Art

FIG. 1 is a simplified block diagram of a display apparatus 100. As shown, the display apparatus 100 includes a memory unit 120, a source driver circuit 170, and a display panel 190.

The memory unit 120 stores gradation data DATA, and outputs the stored gradation data DATA to the source driver circuit 170 in a form of a gradation voltage (also known as a gray-scale voltage). The source driver circuit 180 outputs the gradation voltage to the display panel 190.

As described below in connection with FIG. 2, a complex wiring structure exists between the memory unit 120 and the source driver circuit 170. This results from the width of the memory unit 120 being physically smaller than that of the source driver circuit 170.

Referring to FIG. 2, a graphic memory block GRAM_BLK1 of the memory unit 120 outputs gradation data to three source driver cells SDC1, SDC2, and SDC3 over wires R1, R2 and R3. The graphic memory block GRAM_BLK1 is fabricated using various nano-scale processes, and as a result, the width of the graphic memory block GRAM_BLK1 is physically much smaller that that of the source driver cells SDC1, SDC2, and SDC3. As a result, complex wiring schemes are needed to interface the memory unit 120 and the source driver circuit 170.

SUMMARY OF THE INVENTION

According to an aspect of the present invention, a method of mapping an address is provided, wherein first addresses are mapped to second addresses. The method includes dividing the first addresses into a plurality of first address units, and mapping each of the first address units to generate second address units that correspond to the first address units to store the second addresses.

According to another aspect of the present invention, a method of driving display data outputting gradation data to a source driver block is provided. The method includes dividing addresses of the gradation data into a plurality of first address units, mapping the addresses of the gradation data by mapping addresses in each of the first address units, and outputting data which outputs the mapped addresses of the gradation data to the source driver block.

According to yet another aspect of the present invention, an apparatus for driving display data is provided. The apparatus includes an address mapping unit which divides addresses of data displayed in a plurality of pixels in a display panel into a plurality of first address units and mapping the addresses in each of the first address units, a memory unit which stores data that corresponds to the mapped addresses, and a data output unit which outputs the mapped addresses to the display panel.

According to still another aspect of the present invention an apparatus for driving display data is provided. The apparatus includes an address mapping unit which generates second address units by dividing gradation data displayed on a plurality of pixels in a display panel into a plurality of first address units that are in the form of an a×b matrix, and mapping addresses of the gradation data in each of the first address units into the form of a b×a matrix, wherein the plurality of the first and second address units are arranged in the form of an M×N matrix, wherein a, b, M and N are natural numbers, and a is greater than b. The apparatus further includes a memory unit which stores the second address units having the mapped addresses in the form of a b×a matrix as units in the form of an M×N matrix, a data output unit which receives the data in a×N columns output from the memory unit and outputs the data as data in b×N columns, and a source driver block which receives the data in the b×N columns and transmitting the data to the display panel.

According to another aspect of the present invention, an apparatus for driving display data is provided. The apparatus includes a memory unit comprising a plurality of memory blocks which store data driving a plurality of pixels in a display panel and are arranged in an M×N matrix, where M and N are natural numbers, and outputting data in one row at a time from M-number of memory rows, which are in predetermined columns from among N-number of memory block columns, and then outputs data in each row at a time from M-number of memory rows, which are in the remaining columns except the predetermined columns. The apparatus further includes a data output unit receiving the data and transmitting the data to the display panel.

According to another aspect of the present invention, a method of driving display data is provided, where data in a plurality of memory blocks arranged in the form of an N×N+1 matrix is output to a source driver block, where N is a natural number. The method includes a first outputting operation for outputting data from first through $N^{th}$ columns in a first memory block row to the source driver block, a $L^{th}$ outputting operation for outputting data in the first through $N^{th}$ memory block columns in the $L^{th}$ memory block row to the source driver block, where L is a natural number smaller than N, an $N^{th}$ outputting operation for outputting data in the first through $N^{th}$ memory block columns in the $N^{th}$ memory block rows to the source driver block, and an $N^{th}$+1 outputting operation for outputting for outputting data in the $N^{th}$+1 memory block columns in the first through $N^{th}$ memory block rows to the source driver block.

According to still another aspect of the present invention, a method of driving display data is provided, where data in a plurality of memory blocks that are arranged in the form of an N×M matrix is output to a source driver block, wherein M and N are natural numbers and M is greater than N. The method includes a first outputting operation for outputting data from first through $N^{th}$ columns in a first memory block row to the source driver block, an $L^{th}$ outputting operation for outputting data in the first through $L^{th}$ memory block columns in the $L^{th}$ memory block row to the source driver block, wherein L is a natural number smaller than N, an $N^{th}$ outputting operation for outputting data in the first through $N^{th}$ memory block columns in the $N^{th}$ memory block rows to the source driver block, and an $N^{th}$+1 outputting operation for outputting data in the $N^{th}$+1 through $M^{th}$ memory block columns in the first through $N^{th}$ memory block rows to the source driver block.

According to yet another aspect of the present invention, a method of driving display data is provided, where data in a plurality of memory blocks that are arranged in the form of a matrix is output to a source driver block. The method includes dividing memory block columns into a plurality of memory block column groups, and outputting data in each of the memory block column groups to the source driver block in accordance with an order of memory block rows.

BRIEF DESCRIPTION OF THE DRAWINGS

The above and other aspects and features of the present invention will become readily apparent from the detailed description that follows, with reference to the accompanying drawings, in which.

DETAILED DESCRIPTION OF EMBODIMENTS

Figure 1:
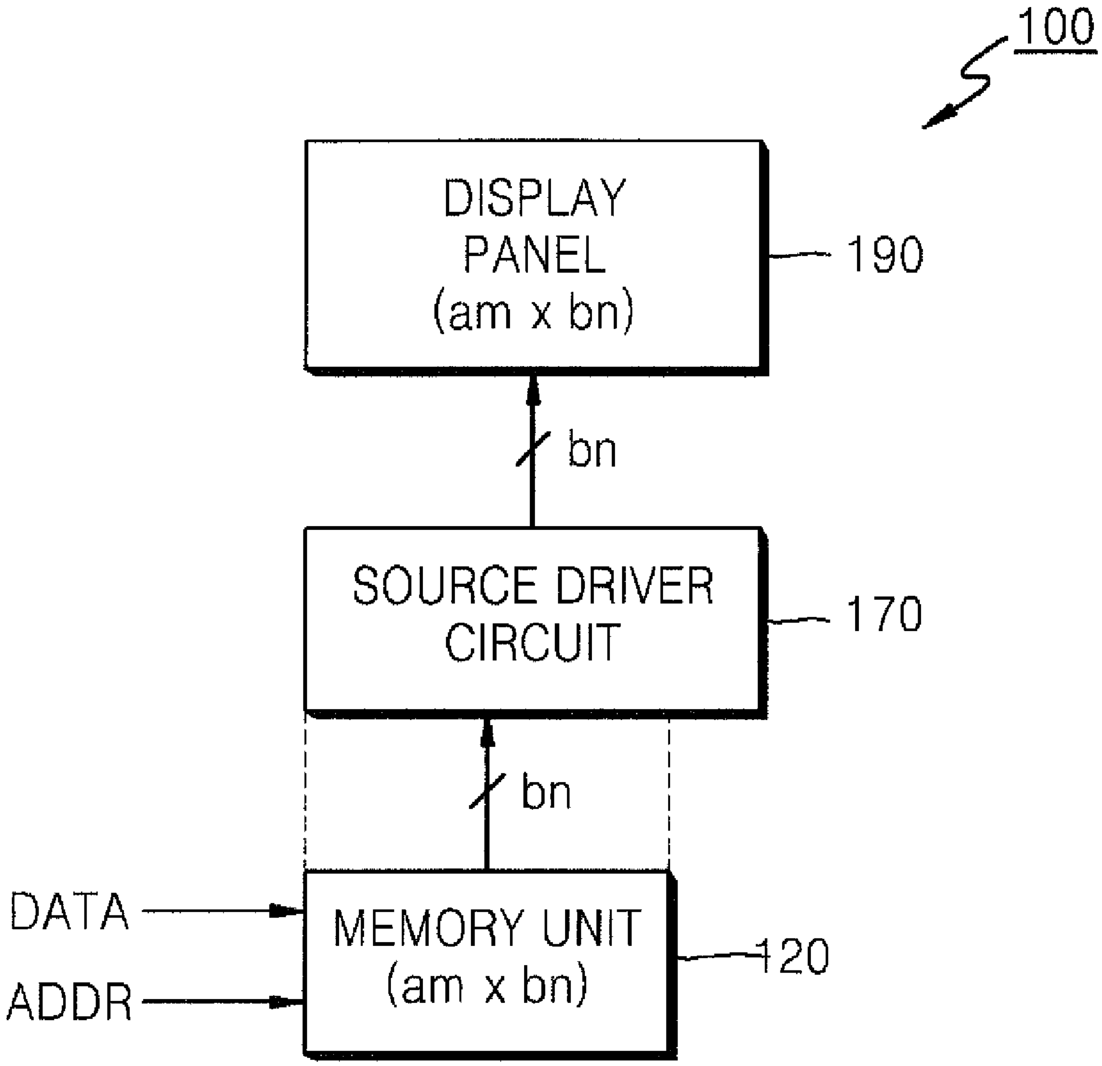
FIG. 1 (PRIOR ART)
FIG. 1 is a block diagram of a display apparatus.
Figure 2:
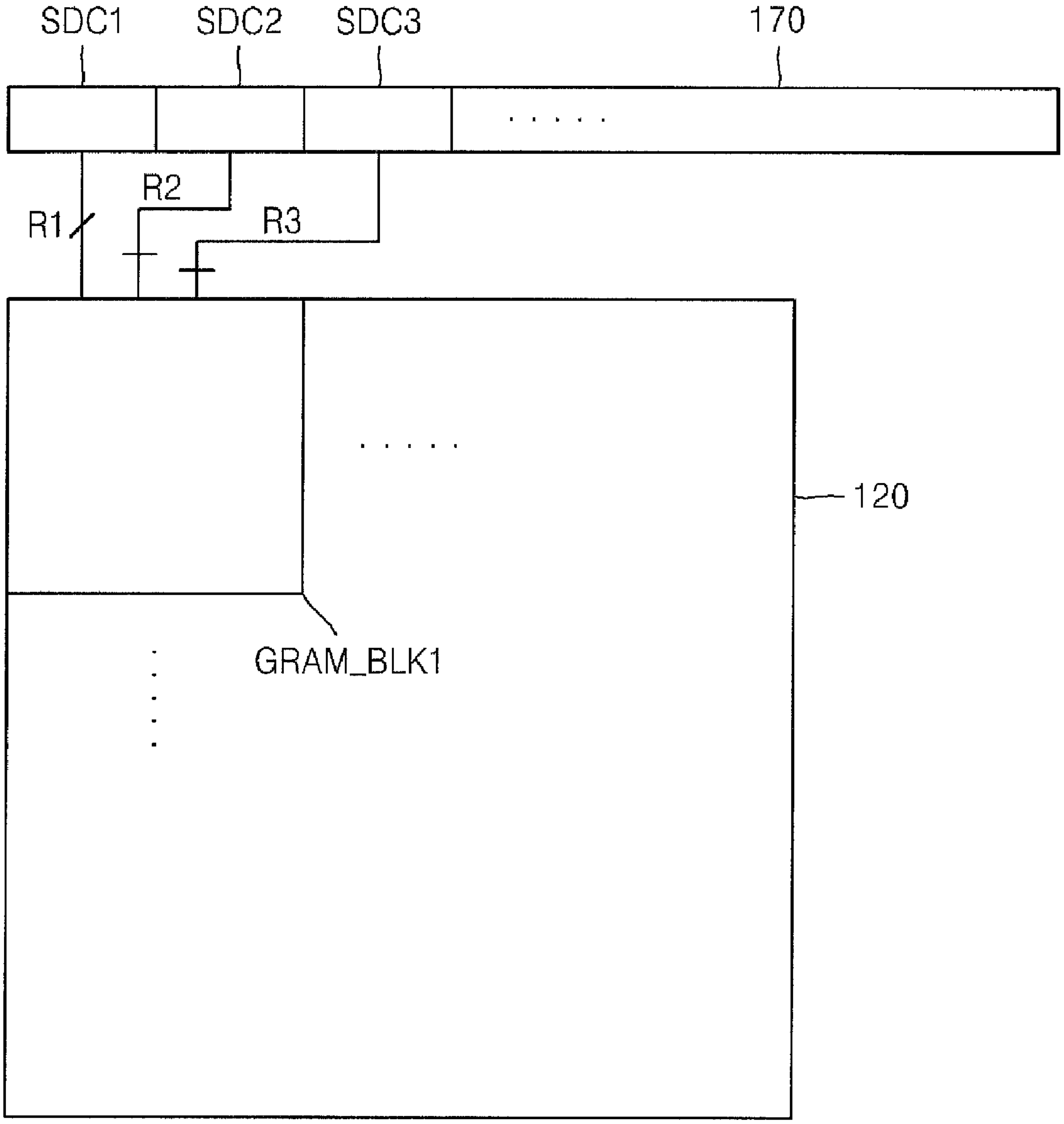
FIG. 2 (PRIOR ART)
FIG. 2 illustrates the connection of a graphic memory block to source driver cells in the display apparatus illustrated in FIG. 1.

The present invention will now be described more fully with reference to the accompanying drawings, in which exemplary and non-limiting embodiments of the invention are shown. Like reference numerals in the drawings denote like elements.

Initially, a method of mapping memory addresses will be described with reference to FIGS. 3A and 3B.

Figure 3A:
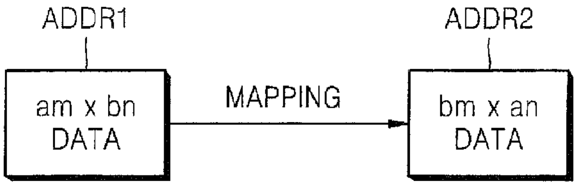
FIGS. 3A and 3B are diagrams for explaining a method of mapping addresses, according to an embodiment of the present invention.

Referring to FIG. 3A, addresses have been arranged in the form of an am×bn matrix are mapped so as to be arranged in the form of a bm×an matrix after mapping. Here, a and b are natural numbers, where a is greater than b. Accordingly, as described in more detail with reference to FIG. 3B, the mapping operation increases the number of columns and decreases the number of rows in which the addresses are arranged.

Figure 3B:
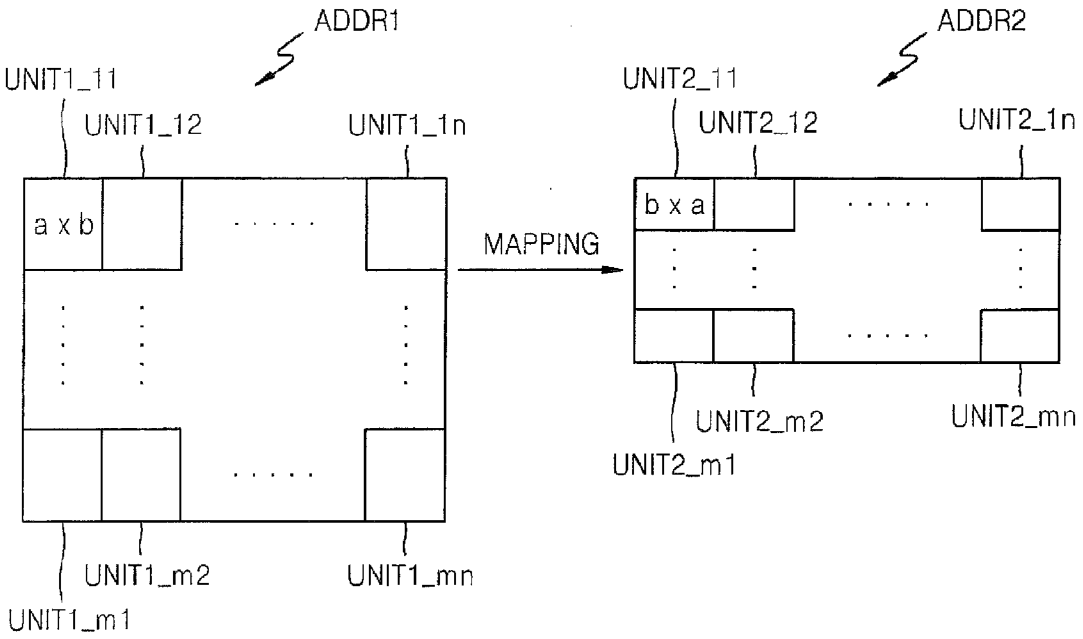

Referring to FIG. 3B, the method of mapping addresses according to the current embodiment includes an operations of dividing addresses and an operation of mapping. In the operation of dividing the addresses, first addresses ADDR1 are divided into a plurality of first address units UNIT1_11~UNIT1_mn in the form of an M×N matrix. In the operation of mapping, each of first address units UNIT1_11~UNIT1_mn is mapped by mapping the first addresses ADDR1 to second addresses ADDR2, and thus second address units UNIT2_11~UNIT2_mn in the form of an M×N matrix corresponding to the first address units UNIT1_11~UNIT1_mn are generated.

In the operation of dividing addresses, each of the first address units UNIT1_11~UNIT1_mn have data arranged in the form of an a×b matrix (a and b denote natural numbers). Here, a may be greater than b.

In this case, in the operation of mapping, the first address units UNIT1_11~UNIT1_mn each having data arranged in the form of an a×b matrix are mapped to the second address units UNIT2_11~UNIT2_mn each having data arranged in the form of a b×a matrix, and the second address units UNIT2_11~UNIT2_mn are generated.

The first address units UNIT1_11~UNIT1_mn and the second address units UNIT2_11~UNIT2_mn may be arranged in the form of an M×N matrix. More specifically, in the method of mapping addresses according to the current embodiment of the present invention, the first addresses ADDR1 arranged in the form of an M×N matrix each having data arranged in the form of an a×b matrix are mapped to the second addresses ADDR2 arranged in the form of an M×N matrix each having data arranged in the form of a b×a matrix.

The number of the first address units UNIT1_11~UNIT1_mn may be the same as the number of the second address units UNIT2_11~UNIT2_mn.

Figure 4A:
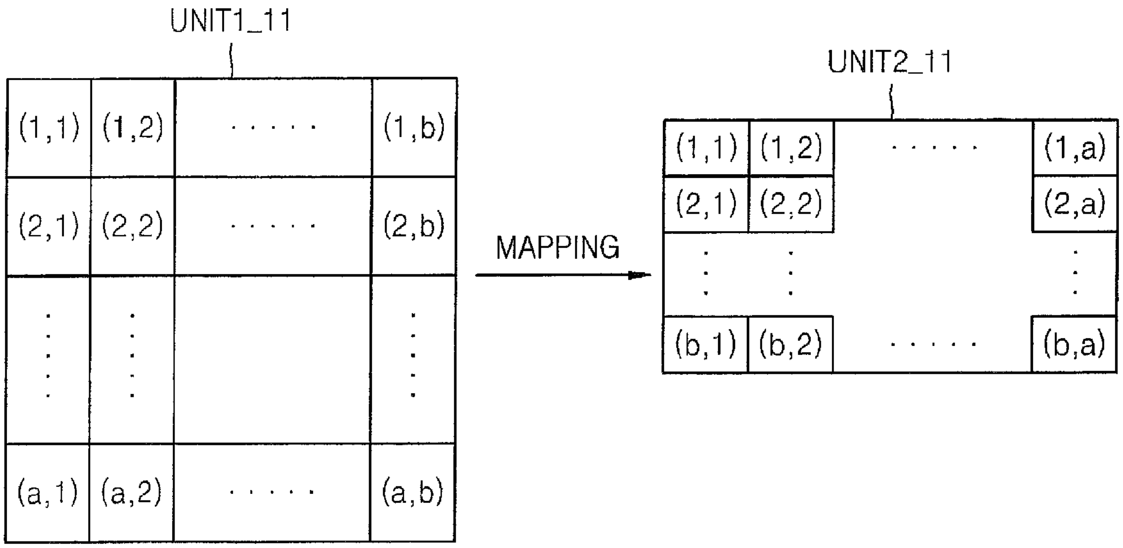
FIGS. 4A through 4C are diagrams showing examples of a method of mapping a first address unit to a second address unit illustrated in FIGS. 3A and 3B, according to an embodiment of the present invention.
Figure 4B:
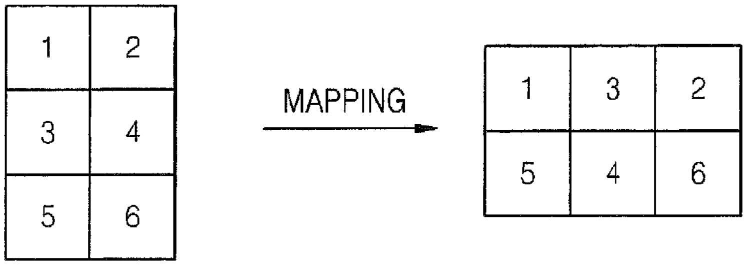
Figure 4C:
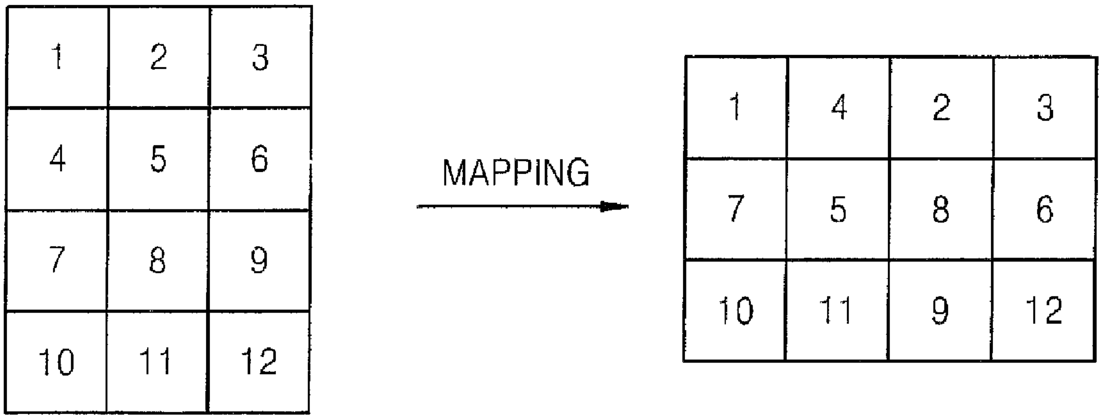

FIGS. 4A through 4C are diagrams illustrating examples of a method of mapping a first address unit UNIT1_11 to a second address unit UNIT2_11 as illustrated in FIGS. 3A and 3B, according to an embodiment of the present invention.

FIG. 4A is a diagram showing an exemplary procedure whereby the first address unit UNIT1_11 having data arranged in the form of an a×b matrix is mapped to the second address unit UNIT2_11 having data arranged in the form of a b×a matrix, according to an embodiment of the present invention.

FIG. 4B is a diagram showing an exemplary procedure whereby the first address unit UNIT1_11 having data arranged in the form of a 3×2 matrix is mapped to the second address unit UNIT2_11 having data arranged in the form of a 2×3 matrix, according to an embodiment of the present invention.

FIG. 4C is a diagram showing an exemplary procedure whereby the first address unit UNIT1_11 having data arranged in the form of a 4×3 matrix is mapped to the second address unit UNIT2_11 having data arranged in the form of a 3×4 matrix, according to an embodiment of the present invention.

Figure 5:
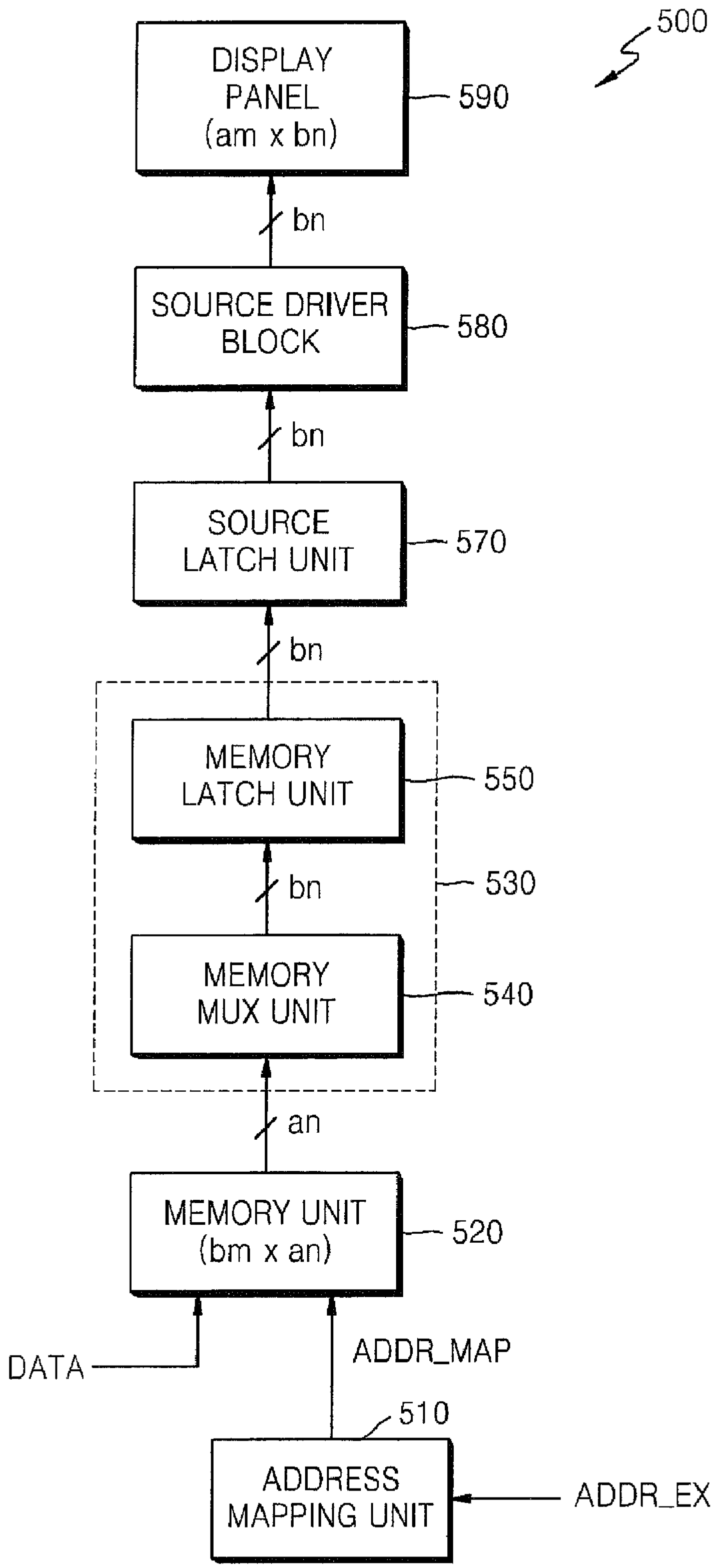
FIG. 5 is a block diagram of an apparatus for driving display data according to an embodiment of the present invention.

FIG. 5 is a block diagram of an apparatus for driving display data 500 according to an embodiment of the present invention.

Figure 6:
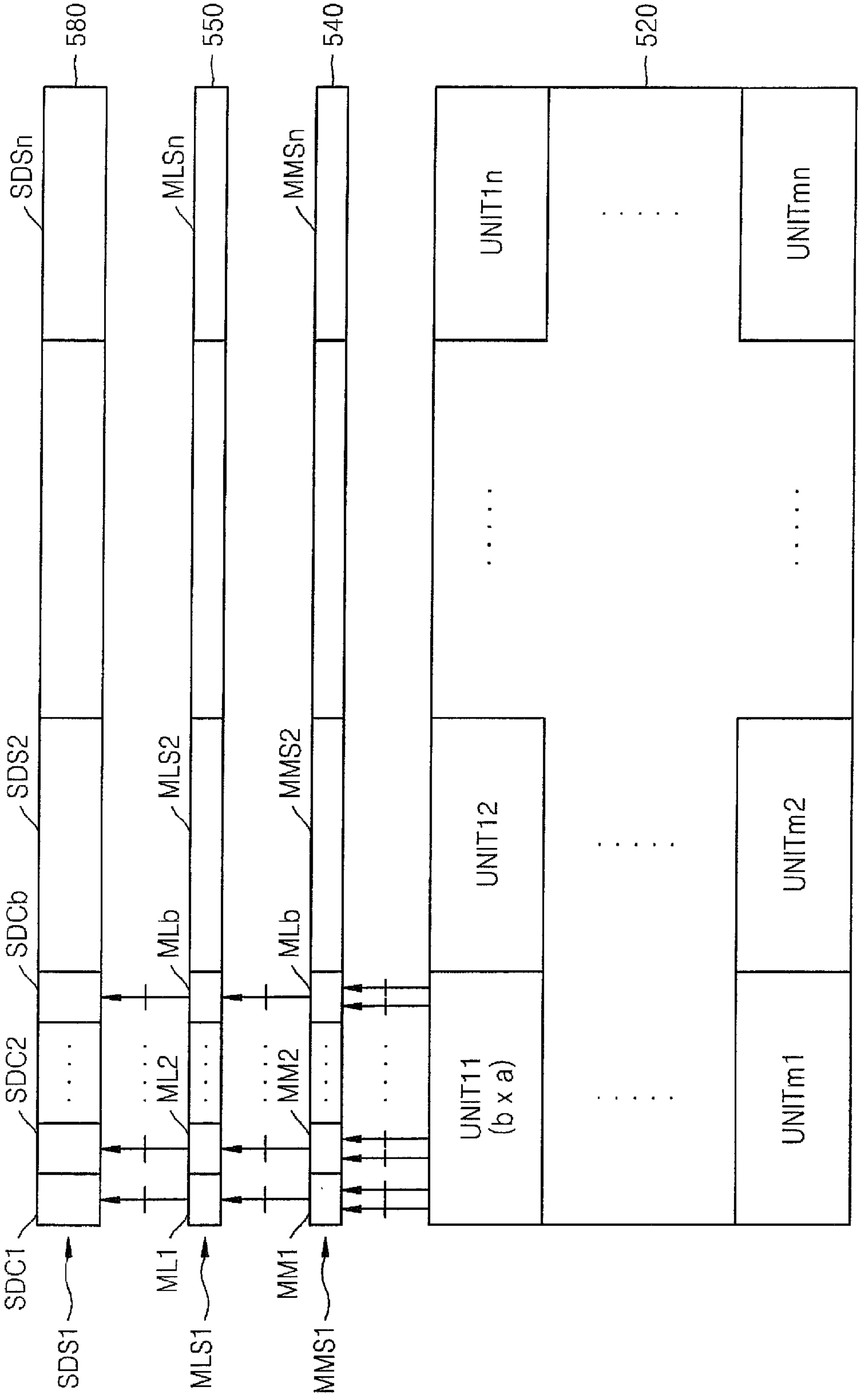
FIG. 6 is a block diagram of a portion of the apparatus for driving display data illustrated in FIG. 5, according to an embodiment of the present invention.

FIG. 6 is a detailed diagram of a portion of the apparatus for driving display data 500 illustrated in FIG. 5, according to an embodiment of the present invention.

Referring to FIGS. 5 and 6, the apparatus for driving display data 500 according to the current embodiment of the present invention includes an address mapping unit 510, a memory unit 520, and a data output unit 530. For convenience of explanation, a source latch unit 570, a source driver block 580 and a display panel 590 are also shown.

In the address mapping unit 510, addresses ADDR_EX of data displayed in a plurality of pixels in the display panel 590 are divided into a plurality of first address units, each address ADDR_EX in the first address units is mapped, and the mapped addresses ADDR_MAP are output. The memory unit 520 stores data of the mapped address ADDR_MAP. The data output unit 530 outputs the mapped addresses ADDR_MAP to the display panel 590.

The address mapping unit 510 divides the addresses ADDR_EX of data into first address units by arranging each of the addresses ADDR_EX in the form of a an a×b matrix (a and b denote natural numbers). Then, the address mapping unit 510 maps the addresses ADDR_EX of data in each of the first address units. Here, a is greater than b.

The address mapping unit 510 may generate second address units UNIT11~UNITmn by mapping the addresses of data in each of the first address units to addresses of data in the form of a b×a matrix.

The memory unit 520 stores the second address units UNIT11~UNITmn in which the mapped addresses ADDR_MAP are arranged in the form of a b×a matrix in the form of an M×N matrix.

The memory unit 520 outputs the mapped addresses ADDR_MAP in a×N columns to the data output unit 530. The data output unit 530 outputs data in the a×N columns as data in b×N columns. The data output unit 530 may output data in the b×N columns first from among data in the a×N columns, and then may latch data in (a−b)×N columns to output.

The data output unit 530 may include a memory multiplexer (MUX) unit 540. The memory MUX unit 540 selectively outputs data in b×N columns or data in (a−b)×N columns. The data output unit 530 may further include a memory latch unit 550. The memory latch unit 550 latches the data output from the memory MUX unit 540 and outputs the latched data.

The memory MUX unit 540 may include a plurality of memory MUX sets MMS1~MMSn. Each of the memory MUX sets MMS1~MMSn may include a plurality of memory MUXs (for example, MM1~Mmb). Each of the memory MUXs (for example, MM1~MMb) may receive data mapped by the corresponding second address unit (UNIT11) and selectively output the received data.

The memory latch unit 550 may include a plurality of memory latch sets MLS1~MLSn. Each of the memory latch sets MLS1~MLSn may include a plurality of memory latches ML1~MLb. Each of the memory latches ML1~MLb may latch the data output from the corresponding memory MUXs MM1~MMb so as to output the data to corresponding source driver cells SDC1~SDCb.

The apparatus for driving display data 500 according to the current embodiment of the present invention may further include a source latch unit 570. The source latch unit 570 latches data received from the data output unit 530, and outputs the data to a source driver block 580.

As described above, the apparatus for driving display data 500 according to the current embodiment of the present invention includes the address mapping unit 510, the memory unit 520, the data output unit 530, and the source driver block 580.

In operation, the address mapping unit 510 divides gradation data displayed in a plurality of pixels in a display panel 590 into a plurality of first address units having addresses arranged in the form of an a×b matrix. Also, the address mapping unit 510 maps addresses of the gradation data in each of the plurality of first address units to addresses in the form of a b×a matrix, and generates second address units. Here, the plurality of first and second address units are arranged in the form of an M×N matrix.

The memory unit 520 stores the second address units in which the mapped addresses are arranged in the form of a b×a matrix as address units having addresses arranged in the form of an M×N matrix, and outputs the data of the addresses. The data output unit 530 receives data in a×N columns output from the memory unit 520, and outputs the data as data in b×N columns. The source driver block 580 includes a plurality of source driver cells which receive data in b×N columns and transmit the data to the display panel 590.

The width of the memory unit 520 may be the substantially same as the width of the source driver block 580. The width of the first address unit stored in the memory unit 520 may be the substantially same as the width of a corresponding source driver cell.

Figure 7:
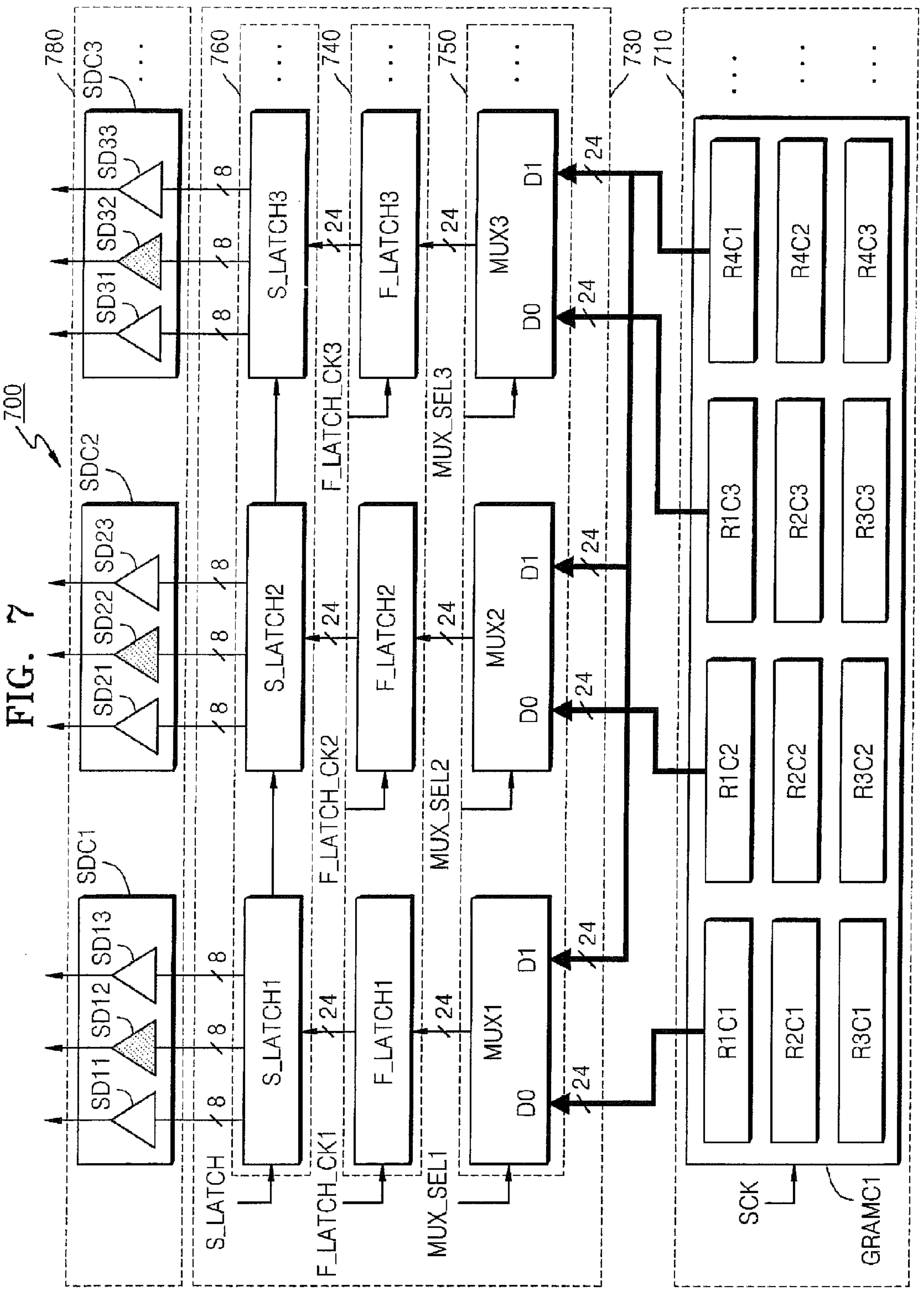
FIG. 7 illustrates an apparatus for driving display data according to another embodiment of the present invention.

FIG. 7 illustrates an apparatus for driving display data 700 according to another embodiment of the present invention.

Referring to FIG. 7, the apparatus for driving display data 700 according to the current embodiment of the present invention includes a memory unit 710 and a data output unit 730. Also shown in FIG. 7 is a source driver unit 780.

The memory unit 710 includes a plurality of memory blocks R1C1 through R4C3 that are arranged in the form of an M×N matrix (M and N denote natural numbers). The memory unit 710 illustrated in FIG. 7 has 12 memory blocks R1C1 through R4C3 arranged in the form of a 3×4 matrix. However, the present invention is not limited to thereto. That is, the number of the memory blocks included in the memory unit 710 is not limited to 12 blocks. Each of the memory blocks R1C1 through R4C3 stores data driving a plurality of pixels (not shown) in a display panel (not shown).

The memory unit 710 outputs data in each row at a time from M-number of memory block rows, which are in predetermined columns from among N-number of memory block columns, and then outputs data in each row at a time from the M-number of memory block rows, which are in the remaining columns.

For example, referring to FIG. 7, the memory unit 710 may output data in 3 columns from among 4 memory block columns to a first memory block row through a third memory block row, and may output data in the remaining column to the first memory block row through the third memory block row. More specifically, data in the memory blocks R1C1, R1C2, and R1C3, data in the memory blocks R2C1, R2C2, and R2C3, and data in the memory blocks R3C1, R3C2, and R3C3 is sequentially output. Then, data in the memory block R4C1, data in the memory block R4C2, and data in the memory block R4C3 is sequentially output.

Figure 8:
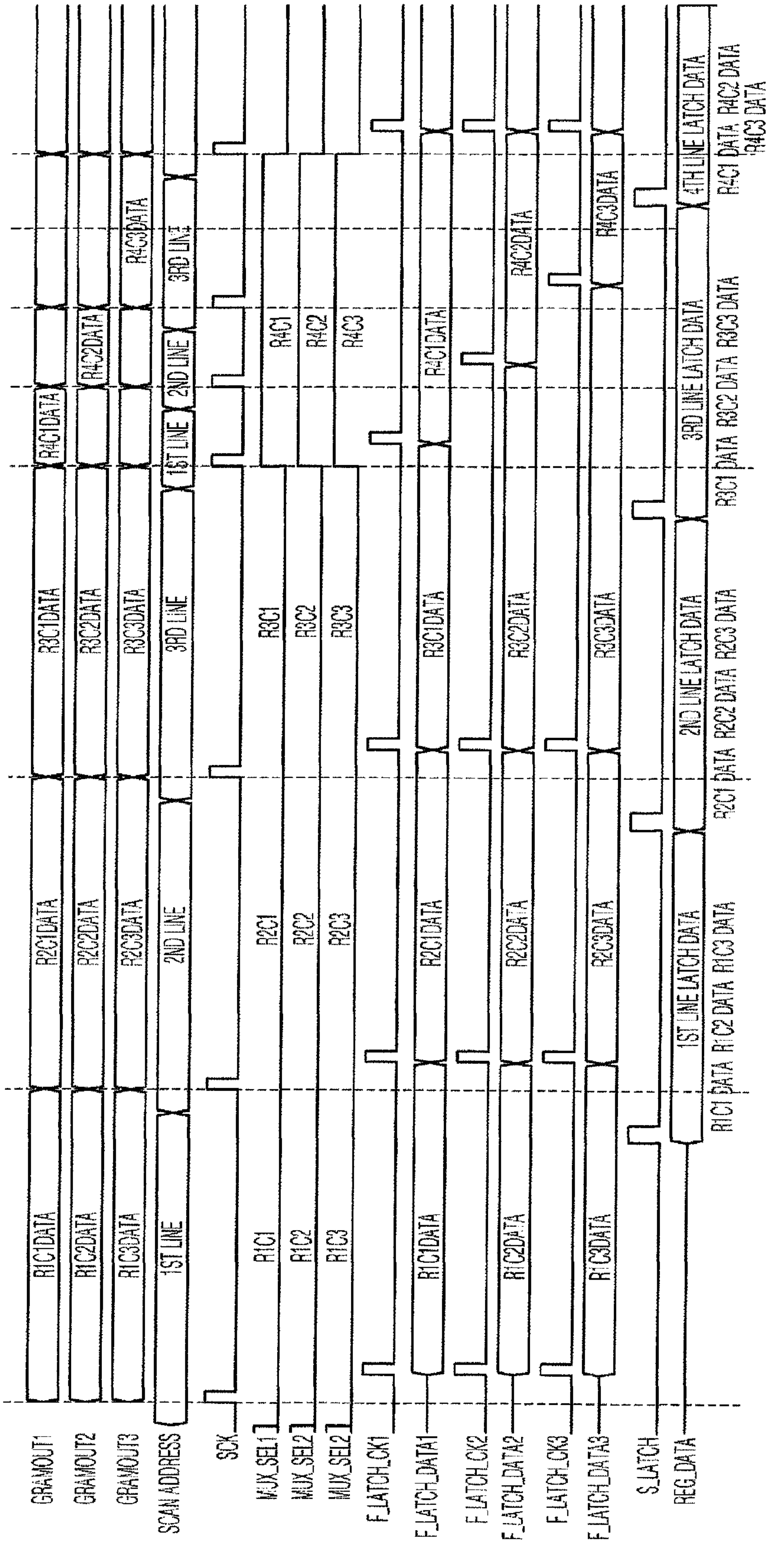
FIG. 8 is a timing diagram for explaining operations of the apparatus for driving display data illustrated in FIG. 7, according to an embodiment of the present invention.

FIG. 8 is a timing diagram for explaining operations of the apparatus for driving display data 700 illustrated in FIG. 7, according to an embodiment of the present invention.

Referring to FIG. 8, the memory unit 710 outputs data in the first through third columns of the first row R1C1DATA, R1C2DATA, and R1C3DATA, data in the first through third columns of the second row R2C1DATA, R2C2DATA, and R2C3DATA, and data in the first through third columns of the third row R3C1DATA, R3C2DATA, and R3C3DATA is sequentially output, in response to an activation of a scan clock SCK. Then, data in the fourth column of the first row R4C1DATA, data in the fourth column of the second row R4C2DATA, and data in the fourth column of the third row R4C3DATA is sequentially output.

As such, the memory unit 710 outputs data in each row at a time from M-number of memory block rows, which are in predetermined columns from among N-number of memory block columns. and then outputs data in each row at a time from the M-number of memory block rows, which are in the remaining columns. For example, data in 3 columns is output first, and then data in the remaining column is output according to an order of the rows of the 3 memory blocks.

The memory unit 710 may sequentially output data in each row at a time from M-number of memory rows, which are in the remaining columns except the predetermined columns, according to an order of the rows of the memory blocks. For example, when outputting data from 3 memory block columns that are in the remaining row, data in the first memory block through data in the third memory block can be sequentially output.

The memory unit 710 may sequentially output data in one row at a time from M-number of memory rows, which are in predetermined columns, within a horizontal cycle. For example, in order to output all data in memory block rows corresponding to predetermined 3 columns, 3 horizontal cycles have to be performed. Also, data in the remaining column can be sequentially output according to an order of the M-number of memory block rows, during one horizontal cycle. For example, during the one horizontal cycle, data in the 3 memory block rows in the remaining column can be sequentially output. Specifically, with reference to FIG. 8, data in the memory blocks R1C1, R1C2, and R1C3 can be output during the first horizontal cycle, data in the memory blocks R2C1, R2C2, and R2C3 can be output during the second horizontal cycle, and data in the memory blocks R3C1, R3C2, and R3C3 can be output during the third horizontal cycle. Then, data in the memory block R4C1, data in the memory block R4C2, and data in the memory block R4C3 can be sequentially output during the fourth horizontal cycle.

The data output unit 730 receives data output from the memory unit 710 and transmits the data to a display panel. The data output unit 730 may include a multiplexer 750, and a first latch unit 740. The multiplexer 750 selectively outputs data in the predetermined columns or data in remaining columns except data in the predetermined columns. The first latch unit 740 latches data output from the multiplexer 750. The first latch unit 740 reads data in one memory block row in the predetermined columns during each horizontal cycle, and reads data in the M-number of memory block rows in the remaining columns during another horizontal cycle. The first latch unit 740 may sequentially reads data in the M-number of memory block rows.

For example, referring to FIG. 8, during the first through fourth horizontal cycles, the multiplexer 750 selects data in the first through third columns R1C1 through R3C3, and the first latch unit 740 latches the data in the first through third columns R1C1 through R3C3 to output the data. Then, during the fourth horizontal cycle, the multiplexer 750 selects data in the fourth column R4C1, R4C2, and R4C3. Meanwhile, as described above, since the data in the fourth column R4C1, R4C2, and R4C3 is sequentially output from the memory unit 710, the multiplexer 750 sequentially outputs the data in the fourth column R4C1, R4C2, and R4C3 to the first latch unit 740. The first latch unit 740 sequentially latches the output data in the fourth column R4C1, R4C2, and R4C3 to output the data. In other words, the first latch unit 740 sequentially outputs the data in the first row of the fourth column R4C1 DATA, the data in the second row of the fourth column R4C2DATA, and the data in the third row of the fourth column R4C3DATA.

The data output unit 760 may further include a second latch unit 760. The second latch unit 760 latches the data received from the first latch unit 740 and outputs the data. The second latch unit 760 outputs data in the first through third columns R1C1 through R3C3 during the first through third horizontal cycles. Also, during the fourth horizontal cycle, the second latch unit 760 outputs the data in the fourth column R4C1, R4C2, and R4C3 which was sequentially received, at once.

The second latch unit 760 may output data latched in the latter part of the horizontal cycle. FIG. 8 illustrates an operation of outputting output data REG_DATA in the second latch unit 760 in the latter part of the horizontal cycle. Specifically, during the fourth horizontal cycle, data in the fourth column R4C1, R4C2, and R4C3 is transmitted to the second latch unit 760 through the memory unit 710, the multiplexer 750, and the first latch unit 740. Accordingly, after the data in the fourth column R4C1, R4C2, and R4C3 is sequentially received by the second latch unit 760, the second latch unit 760 latches the data in the fourth column R4C1, R4C2, and R4C3 and outputs the data in the latter part of the fourth horizontal cycle.

The source driver unit 780 in the example of FIG. 7 includes a plurality of source driver circuits SDC1, SDC2 and SCC3, respectively receiving latched data from the latches S_LATCH1, S_LATCH2 and S_LATCH3 of the second latch unit 760. The source driver circuit SDC1 includes source drivers SD11, SD12 and SD13. The source driver circuit SDC2 includes source drivers SD21, SD22 and SD23. The source drive circuit SDC3 includes source drivers SD31, SD32 and SD33.

Figure 9:
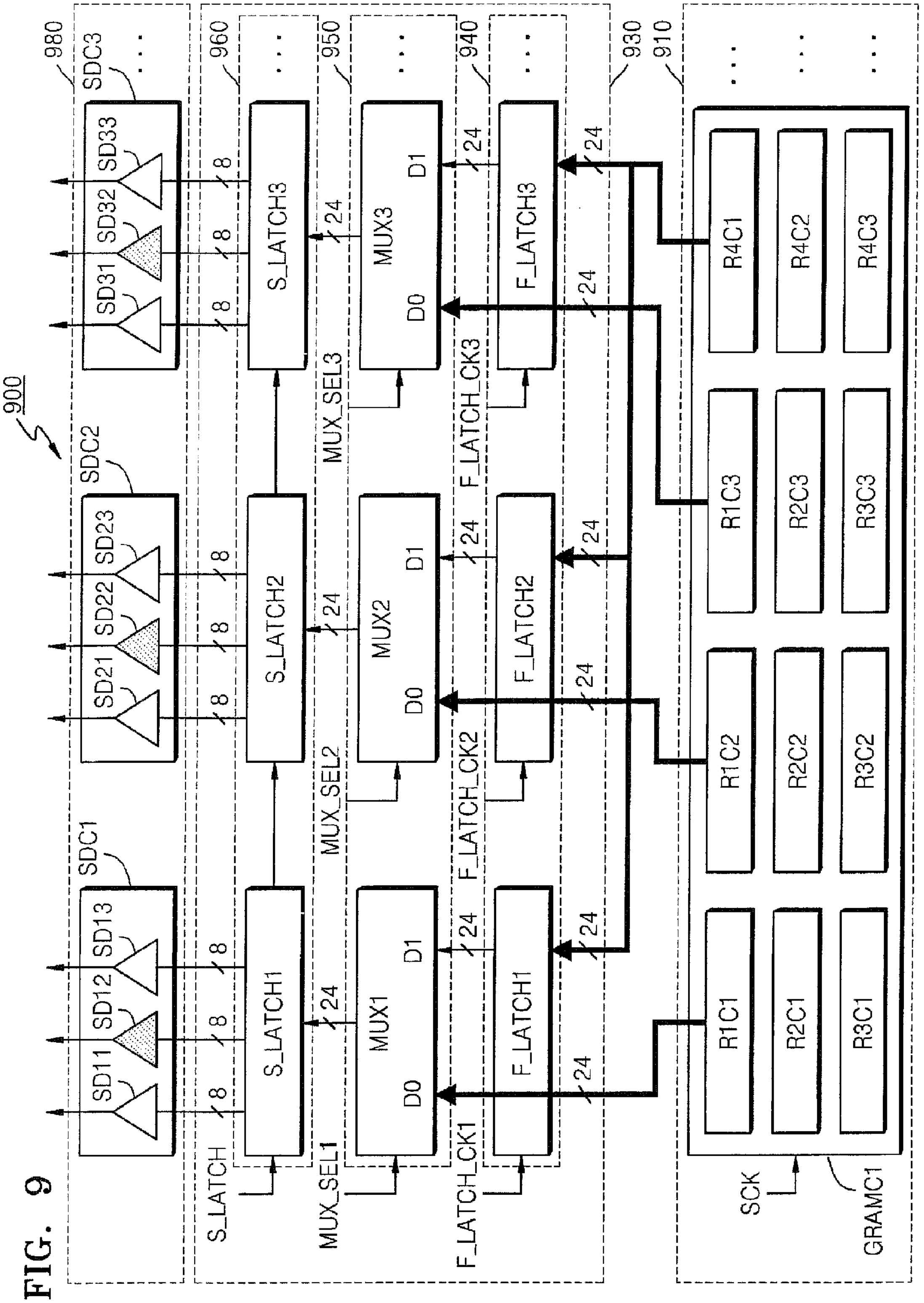
FIG. 9 illustrates an apparatus for driving display data according to another embodiment of the present invention.

FIG. 9 illustrates an apparatus for driving display data 900 according to another embodiment of the present invention.

In the previously described apparatus for driving display data 700 illustrated in FIG. 7, the multiplexer 750 is placed in front of the first latch unit 740. In contrast, in the apparatus for driving display data 900 according to the current embodiment of FIG. 9, a first latch unit 940 is placed in front of a multiplexer 950. Apart from the relative placement of the first latch units 740 and 940 and the multiplexers 750 and 950, the structure and operations of the apparatus for driving display data 900 according to the current embodiment are the same as the structure and operations of the apparatus for driving display data 700 according to the previous embodiment. Thus, a detailed explanation of the structure and operations of the apparatus for driving display data 900 according to the current embodiment is omitted here to avoid redundancy in the description.

Figure 10:
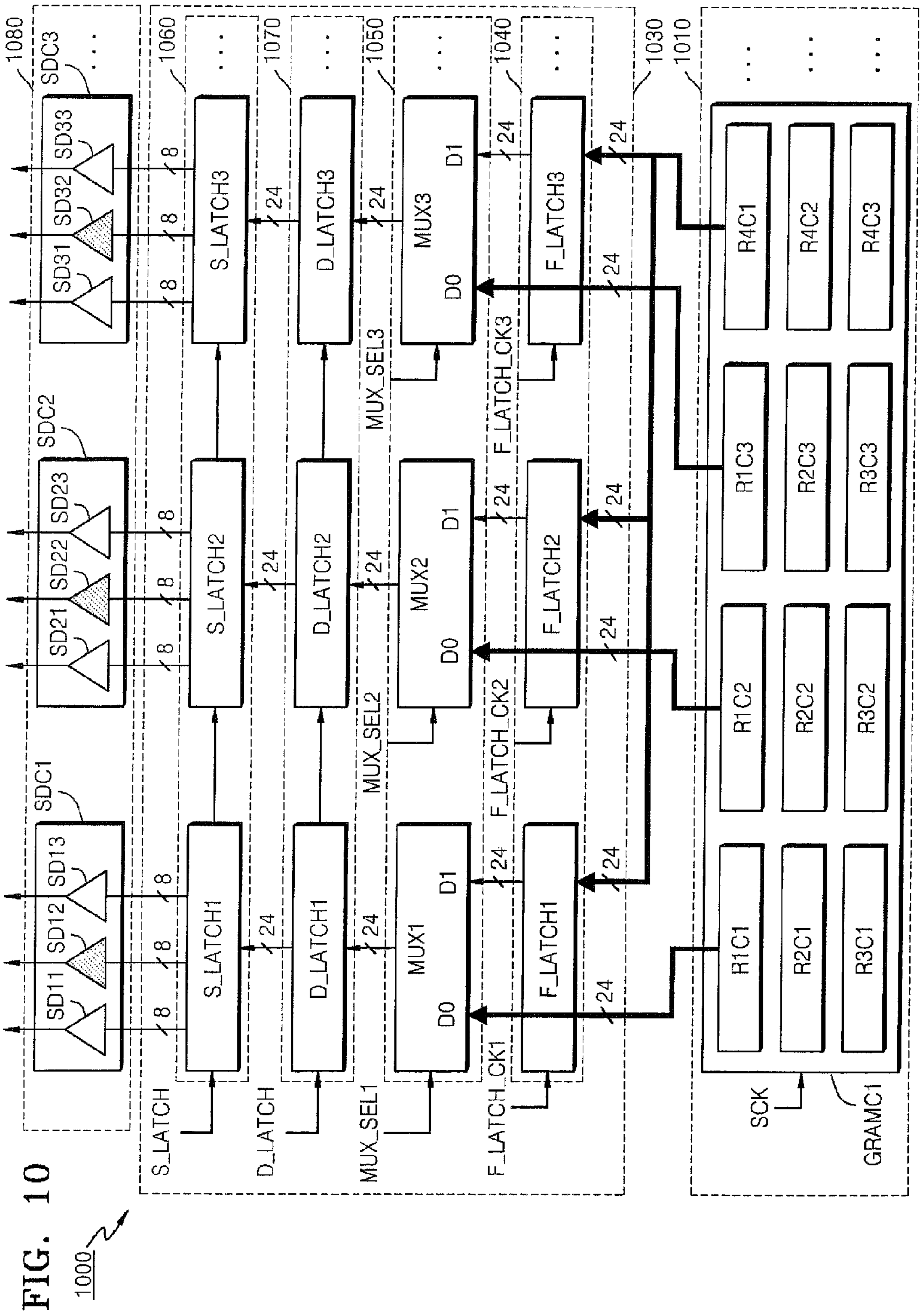
FIG. 10 illustrates an apparatus for driving display data according to another embodiment of the present invention.
Figure 11:
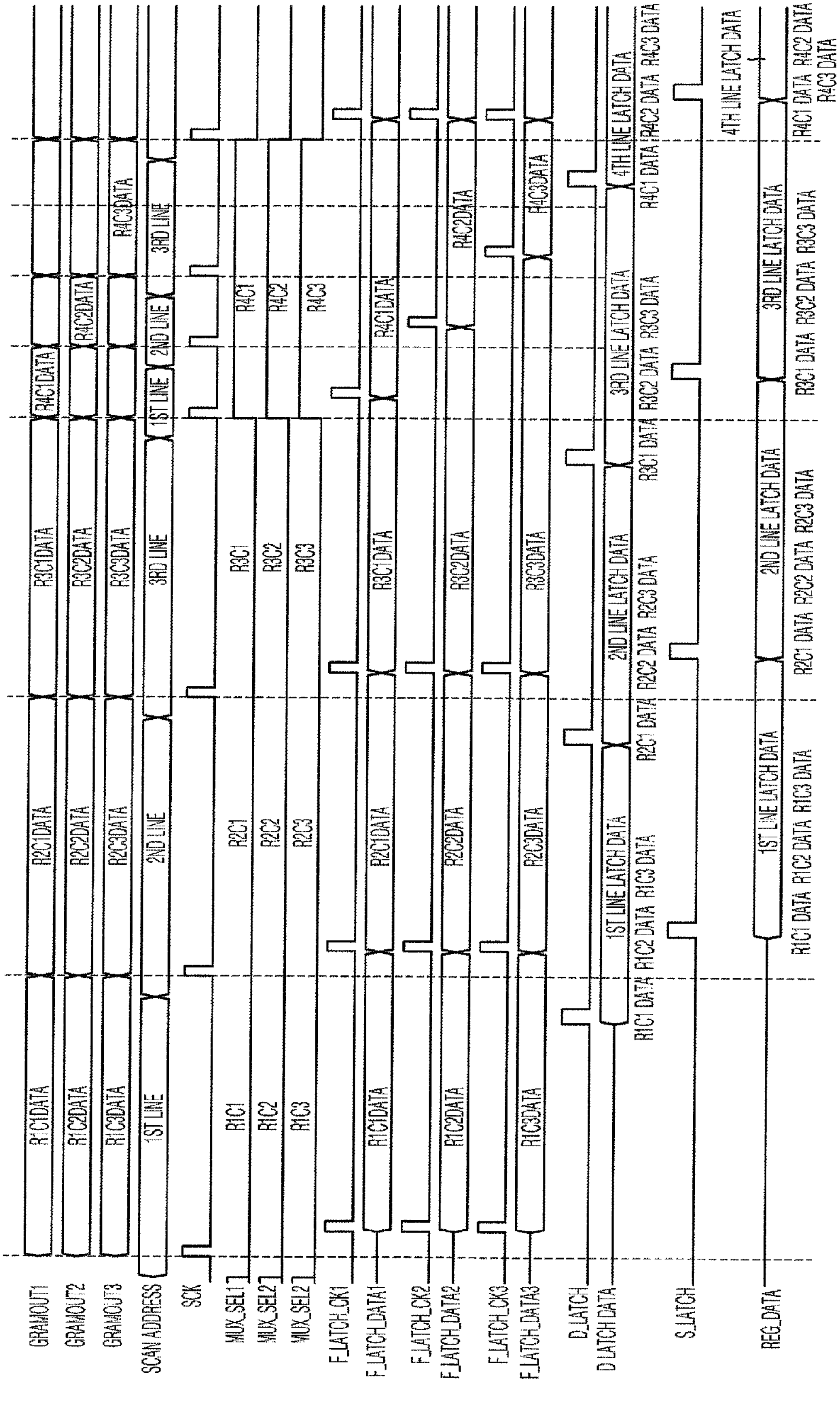
FIG. 11 is a timing diagram for explaining operations of the apparatus for driving display data illustrated in FIG. 10, according to an embodiment of the present invention.

FIG. 10 illustrates an apparatus for driving display data 1000 according to another embodiment of the present invention. FIG. 11 is a timing diagram for explaining operations of the apparatus for driving display data 1000 illustrated in FIG. 10, according to an embodiment of the present invention.

Referring to FIG. 10, the apparatus for driving display data 1000 according to the current embodiment of the present invention further includes a third latch unit 1070 when compared to the apparatuses for driving display data 700 and 900 illustrated in FIGS. 7 and 9, respectively.

The third latch unit 1070 latches data received from a multiplexer unit 1050 and outputs the data. A second latch unit 1060 latches the data received from the third latch unit 1070 and outputs the data. The third latch unit 1070 outputs the latched data in the latter part of a horizontal cycle, and the second latch unit 1060 outputs the latched data in the early part of a next horizontal cycle. Referring to FIG. 11, output data D_LATCH_DATA of the third latch unit 1070 is output in the latter part of a horizontal cycle, and output data REG_DATA of the second latch unit 1060 is output in the early part of the next horizontal cycle. Accordingly, the second latch unit 1060 placed at the end of a data output unit 1030 may output data in the early part of the horizontal cycle.

Except as described above, the structure and operations of the apparatus for driving display data 1000 according to the current embodiment are the same as the structure and operations of the apparatus for driving display data 700 according to the previous embodiment. Thus, a detailed explanation of the structure and operations of the apparatus for driving display data 1000 according to the current embodiment is omitted here to avoid redundancy in the description.

Figure 12:
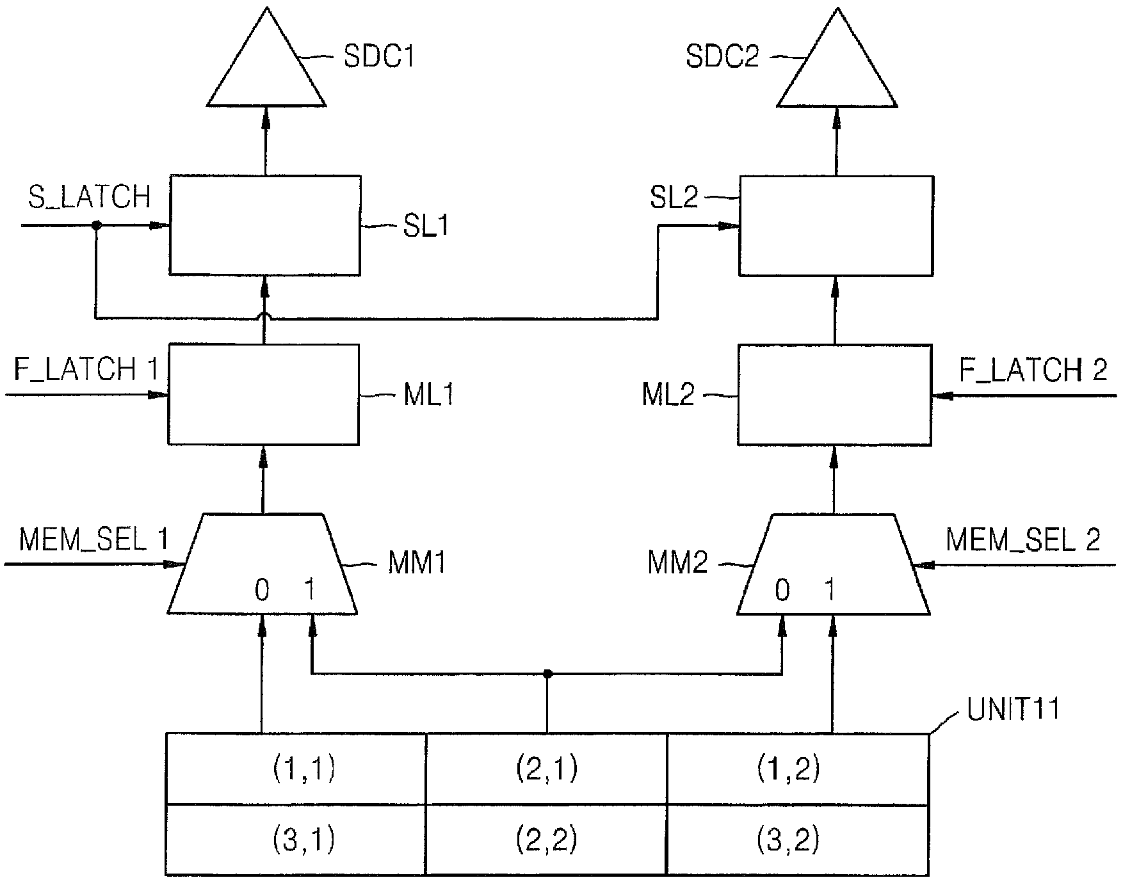
FIG. 12 illustrates an apparatus for driving display data according to another embodiment of the present invention.

FIG. 12 illustrates an apparatus for driving display data according to another embodiment of the present invention.

Referring to FIG. 12, the apparatus for driving display data illustrated according to the current embodiment outputs data mapped in the form of a 3×2 matrix to source driver cells SDC1 and SDC2. The apparatus receives data in the form of 2×3 matrix and maps the data in the form of 2×3 matrix as data in the form of a 3×2 matrix.

In FIG. 12, only one first address unit UNIT11 including data mapped in the form of 2×3 matrix is illustrated. However, the present invention is not limited thereto.

Figure 13:
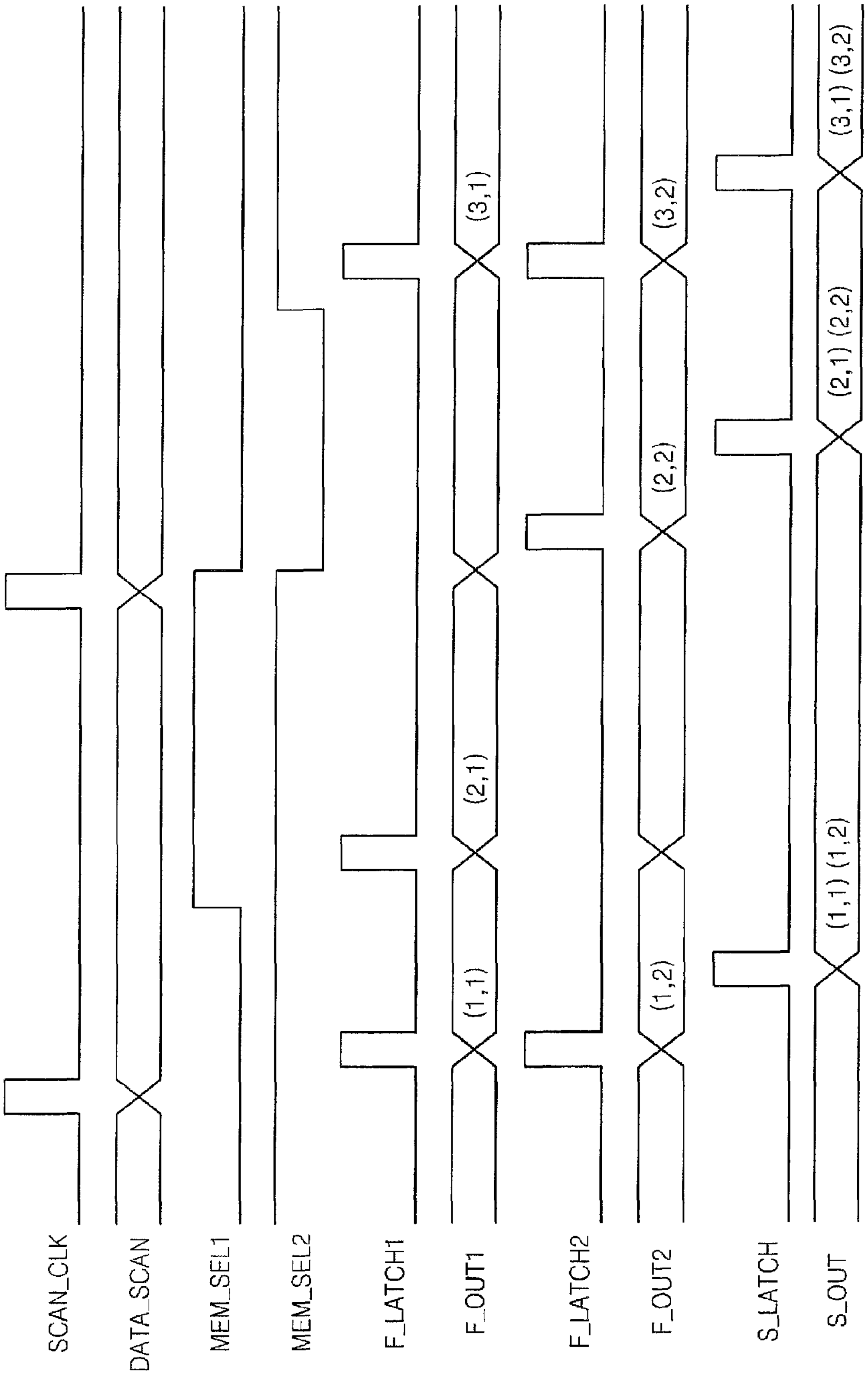
FIG. 13 is a timing diagram for explaining operations of the apparatus for driving display data illustrated in FIG. 12, according to an embodiment of the present invention.

FIG. 13 is a timing diagram for explaining operations of the apparatus for driving display data illustrated in FIG. 12, according to an embodiment of the present invention.

When a scan clock signal SCAN_CLK is activated for the first time, data in a first row (1, 1), (2, 1), and (1, 2) of a first address unit UNIT11 is transferred to memory MUXs MM1, and MM2 during a DATA_SCAN section illustrated in FIG. 13.

The memory MUX MM1 outputs the data in (1, 1) to a memory latch ML1, in response to a memory MUX selecting signal MEM_SEL1 having a logic low level. The memory MUX MM2 outputs the data in (1, 2) to a memory latch ML2, in response to a memory MUX selecting signal MEM_SEL2 having a logic high level. In this case, memory latch signals F_LATCH1, and F_LATCH2 are activated. Accordingly, the memory latches ML1, and ML2 latch data in (1, 1) and (1, 2) respectively, and output the data. In this case, a source latch signal S_LATCH is activated. Accordingly, source latches SL1, and SL2 output data in (1, 1) and (1, 2) to the source driver cells SDC1, and SDC2.

When the memory MUX selecting signal MEM_SEL1 transitions to a logic high level and the memory MUX selecting signal MEM_SEL2 maintains a logic high level, the memory MUX MM1 outputs the data in (2, 1) to the memory latch ML1. In this case, the memory latch signal F_LATCH1 is activated, and therefore the memory latch ML1 latches the data in (2, 1) and outputs to the source latch SL1.

The data in (2, 1) latched in the source latch SL1 is not directly output to the source driver cell SDC1. The latched data in (2, 1) is output to the source driver cell SDC1 together with the data in (2, 2) when a second source latch signal S_LATCH is activated.

When the scan clock signal SCAN_CLK is activated again, data in the second row (3, 1), (2, 2), and (3, 2) in the first address unit UNIT11 is transferred to memory MUXs MM1, and MM2.

The memory MUX outputs the data in (3, 1) to the memory latch ML1, in response to the memory MUX selecting signal MEM_SEL1 having a logic low level. The memory MUX MM2 outputs the data in (2, 2) to the memory latch ML2, in response to the memory MUX selecting signal MEM_SEL2 having a logic low level. In this case, the memory latch signal F_LATCH2 is activated. Accordingly, the memory latch ML2 latches the data in (2, 2) and outputs the data. In this case, the source latch signal S_LATCH is activated. Accordingly the source latches SL1, and SL2 output the data in (2, 1) and (2, 2) to the source driver cells SDC1 and SDC2, respectively. Here, the data in (2, 1) is the data latched in the source latch SL1 when the scan clock signal SCAN_CLK is activated for the first time.

When the memory MUX selecting signal MEM_SEL1 maintains a logic low level and memory MUX selecting signal MEM_SEL2 transitions to a logic high level, the memory MUXs MM1, and MM2 output data in (3, 1) and (3, 2) to the memory latch ML1. In this case, the memory latch signals F_LATCH1, and F_LATCH2 are activated. Accordingly, the source latches SL1, and SL2 output the data in (3, 1) and (3, 2) to the source driver cells SDC1 and SDC2.

According to the present invention, a method of mapping an address, and a method and apparatus for driving display data can be used to simplify a wiring structure between memory blocks and source driver clocks and reduce the length of a side of a memory unit having the memory blocks.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of operating a display device, the method comprising:

receiving input display data including gradation data and corresponding first addresses of the display panel, the first addresses including an (a*M)×(b*N) matrix of the first addresses of the display panel, wherein a, b, M and N are integers, and a is greater than b;

grouping the (a*M)×(b*N) matrix of first addresses into an M×N matrix of first address units, wherein each of the M×N matrix of first address units includes an a×b sub-matrix of the first addresses;

mapping each of the M×N matrix of first address units to generate an M×N matrix of second address units of a memory, wherein each of the M×N matrix of second address units includes a b×a sub-matrix of second addresses respectively corresponding to each a×b sub-matrix of the first address of the first address units;

storing the gradation data of the input display data in the memory at the second address units mapped from the first address units; and outputting the gradation data stored in the memory to the display unit.

2. The method of claim 1, further comprising:

outputting the gradation data of the memory to a source driver block.

3. An apparatus for driving display data, the apparatus comprising:

an address mapping unit which groups an (a*M)×(b*N) matrix of first addresses of a display panel into an M×N matrix of first address units, wherein each of the M×N matrix of first address units includes an a×b sub-matrix of the first addresses, wherein a, b, M and N are integers, and which maps each of the M×N matrix of first address units to generate an M×N matrix of second address, wherein each of the M×N matrix of second address units includes a b×a sub-matrix of second addresses respectively corresponding to each a×b sub-matrix of the first address of the first address units, and where a is greater than b;

a memory unit which stores gradation data of input display data of the display panel, the input display data including the first addresses, and the memory unit storing the gradation data at a second address units mapped from the first address units; and a data output unit which outputs the gradation data of the memory unit to the display panel.

4. The apparatus of claim 3, further comprising:

a source driver block which receives the data from the data output unit and transmitting the data to a display panel, wherein a width of the memory unit is the substantially same as a width of the source driver block.

5. The apparatus of claim 3, further comprising:

a source driver block which receives the data from the data output unit and transmitting the data to a display panel ,wherein a width of the mapped address unit that is stored in the memory unit is the substantially same as a width of a corresponding source driver cell.

6. The apparatus of claim 3, wherein the memory unit outputs the mapped addresses in a×N columns to a data output unit, and the data output unit outputs data in the a×N columns as data in b×N columns.

7. The apparatus of claim 6, wherein the data output unit outputs data in b×N columns first from among data in the a×N columns and then latches data in (a−b)×N columns to be output.

8. The apparatus of claim 7, wherein the data output unit comprises a memory multiplexer unit which selectively outputs the data in the b×N columns or the data in the (a−b)×N columns.

* * * * *

UNITED STATES PATENT AND TRADEMARK OFFICE

CERTIFICATE OF CORRECTION

PATENT NO. : 8,310,495 B2
APPLICATION NO. : 11/857500
DATED : November 13, 2012
INVENTOR(S) : Bae et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1195 days.

Signed and Sealed this
Seventh Day of October, 2014

Michelle K. Lee
*Deputy Director of the United States Patent and Trademark Office*